United States Patent
Chen

(10) Patent No.: US 10,602,448 B2
(45) Date of Patent: Mar. 24, 2020

(54) REMOTE WAKEUP METHOD, CONNECTION SERVER, AND NETWORKING APPARATUS HAVING SLEEP MODE

(71) Applicants: ThroughTek Technology (ShenZhen) Co., Ltd., Shenzhen (CN); ThroughTek Co., Ltd., Taipei (TW)

(72) Inventor: Yong-Sheng Chen, Taipei (TW)

(73) Assignees: THROUGHTEK TECHNOLOGY (SHENZHEN) CO., LTD., Shenzhen (CN); THROUGHTEK CO., LTD., Taipei (TW)

(*) Notice: Subject to any disclaimer, the term of this patent is extended or adjusted under 35 U.S.C. 154(b) by 14 days.

(21) Appl. No.: 15/685,661

(22) Filed: Aug. 24, 2017

(65) Prior Publication Data

US 2018/0063789 A1 Mar. 1, 2018

(30) Foreign Application Priority Data

Aug. 29, 2016 (TW) ............................. 105127737 A

(51) Int. Cl.
*H04W 52/02* (2009.01)
*H04L 12/12* (2006.01)

(52) U.S. Cl.
CPC ......... *H04W 52/0229* (2013.01); *H04L 12/12* (2013.01); *H04W 52/027* (2013.01); *H04W 52/0216* (2013.01); *Y02D 70/00* (2018.01); *Y02D 70/22* (2018.01)

(58) Field of Classification Search
None
See application file for complete search history.

(56) References Cited

U.S. PATENT DOCUMENTS

| | | | | |
|---|---|---|---|---|
| 2007/0050645 | A1* | 3/2007 | Siegmund | H04L 12/12 713/300 |
| 2008/0034197 | A1* | 2/2008 | Engel | H04L 63/0428 713/150 |
| 2014/0072277 | A1* | 3/2014 | Takao | G06Q 10/109 386/239 |
| 2015/0074432 | A1* | 3/2015 | Winter | G06F 1/3209 713/300 |
| 2015/0172423 | A1* | 6/2015 | Wu | H04L 69/08 370/310 |
| 2015/0172473 | A1* | 6/2015 | Estrada | H04M 15/00 379/114.16 |
| 2016/0112955 | A1* | 4/2016 | Grau | H04W 52/0235 370/311 |

* cited by examiner

*Primary Examiner* — Ayanah S George
(74) *Attorney, Agent, or Firm* — Muncy, Geissler, Olds & Lowe, P.C.

(57) ABSTRACT

A remote wakeup method includes: receiving a wakeup request packet from a first apparatus, obtaining a wakeup information according to the wakeup request packet, generating an apparatus wakeup packet according to the wakeup request packet and the wakeup information, obtaining a connection information corresponding to a second apparatus according to the wakeup request packet, and sending the apparatus wakeup packet to the second apparatus based on the connection information. The wakeup request packet includes a device identifier (UID) of the second apparatus, and the apparatus wakeup packet includes the device identifier of the second apparatus and wakeup information.

25 Claims, 10 Drawing Sheets

LAN 20

REMOTE WAKEUP METHOD, CONNECTION SERVER, AND NETWORKING APPARATUS HAVING SLEEP MODE

CROSS-REFERENCE TO RELATED APPLICATION

This non-provisional application claims priority under 35 U.S.C. § 119(a) to Patent Application No. 105127737 filed in Taiwan, R.O.C. on Aug. 29, 2016, the entire contents of which are hereby incorporated by reference.

BACKGROUND

Technical Field

The present invention relates to a network communications system, and in particular, to a remote wakeup method, a connection server, and a networking apparatus having a sleep mode.

Related Art

With the progress of sciences and technologies, the Internet of Things (IOT) has been widely used in family smart facilities, mobile terminal devices, industrial system environments, and the like. Under the IOT architecture, various apparatuses surrounding each person may be connected to a network, and a user can perform relevant control, access, and the like on the apparatuses by means of the network. To provide a service for a long term, a networking apparatus in the IOT architecture needs to have power-saving and networking capabilities at the same time. When being idle, the networking apparatus enters a sleep mode to save power. When the networking apparatus is in the sleep mode, there must be a method capable of remotely waking up the networking apparatus, so as to continue to provide services of the apparatus. However, it would not be easy to wake up the network apparatus by means of the Internet or a router.

However, a great amount of knowledge about the network is necessary for the existing wakeup technologies, so that settings, such as a main board, a network card, and a firewall, can be learned, thereby facilitating implementation of a remote wakeup function. Further, most existing wakeup technologies wake up an apparatus in a router broadcasting manner and cannot directly wake up a remote networking apparatus.

SUMMARY

In an embodiment, a remote wakeup method includes: receiving a wakeup request packet from a first apparatus, obtaining a wakeup information according to the wakeup request packet, generating an apparatus wakeup packet according to the wakeup request packet and the wakeup information, obtaining a connection information corresponding to a second apparatus according to the wakeup request packet, and sending the apparatus wakeup packet to the second apparatus based on the connection information. The wakeup request packet includes a device identifier (UID) of the second apparatus, and the apparatus wakeup packet includes the device identifier of the second apparatus and wakeup information.

In an embodiment, a connection server includes a network module, a storage unit, and a control unit. The control unit connects to the network module and storage unit, and the storage unit stores a connection information and a wakeup information that correspond to a second apparatus. The control unit receives a wakeup request packet from a first apparatus through the network module, obtains the wakeup information and the connection information according to the wakeup request packet, generates an apparatus wakeup packet according to the wakeup request packet and the wakeup information, and sends the apparatus wakeup packet to the second apparatus through the network module based on the connection information. The wakeup request packet includes a device identifier (UID) of the second apparatus, and the apparatus wakeup packet includes the device identifier of the second apparatus and wakeup information.

In an embodiment, a network apparatus having a sleep mode includes a network module, a storage unit, and a control unit. The control unit connects to the network module and storage unit, and the storage unit stores a device identifier (UID) and a wakeup information. Before entering the sleep mode, the control unit generates a pre-stored feature data according to the device identifier and the wakeup information and stores the pre-stored feature data in the storage unit. The pre-stored feature data includes entire data or partial data of the device identifier and the wakeup information. In the sleep mode, the network module still keeps running and when receiving an apparatus wakeup packet, performs comparison according to the pre-stored feature data and the apparatus wakeup packet, so as to wake up the networking apparatus.

In conclusion, according to the remote wakeup method, connection server, and networking apparatus having a sleep mode of the present invention, the networking apparatus (namely, the second apparatus) may be enabled to enter an ultra-low power consumption state (the sleep state), and a first apparatus can be provided to use a device identifier of the second apparatus to directly initiate a wakeup request (a wakeup request packet) to the remote second apparatus by means of the connection server, so that it is unnecessary to perform any setting (for example, settings on apparatuses such as a main board, a network card, and a firewall) or use network broadcasting to wake up the remote second apparatus without reducing a number of network packets in a local area network (LAN).

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1A:
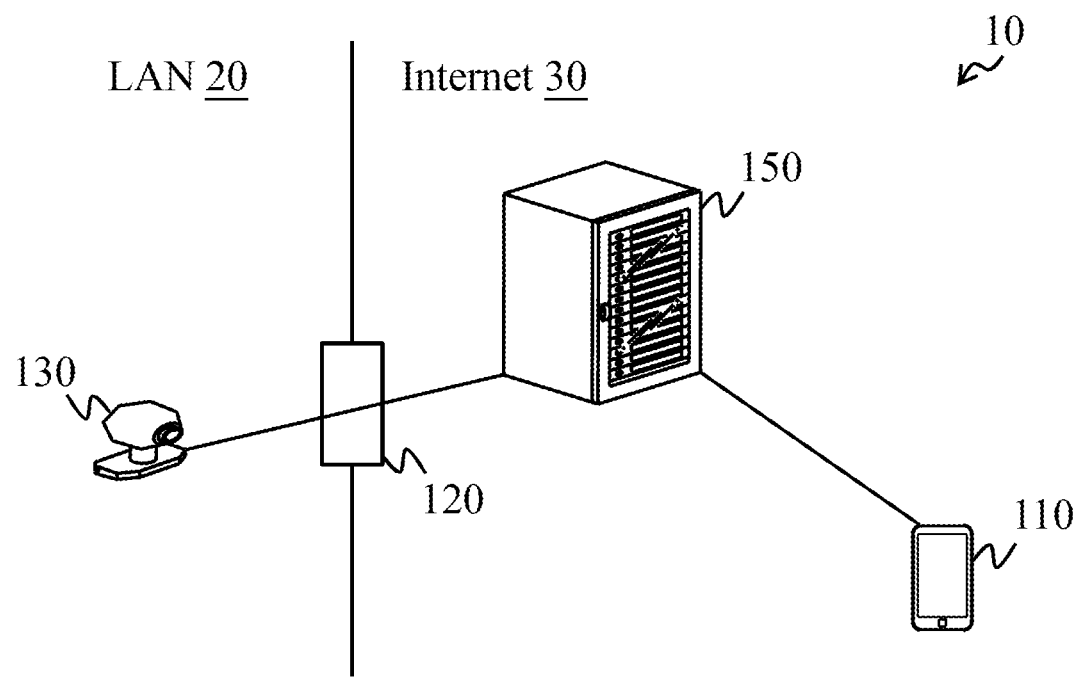
FIG. 1A and FIG. 1B are schematic diagrams of a network communications system according to an embodiment of the present invention.
Figure 1B:
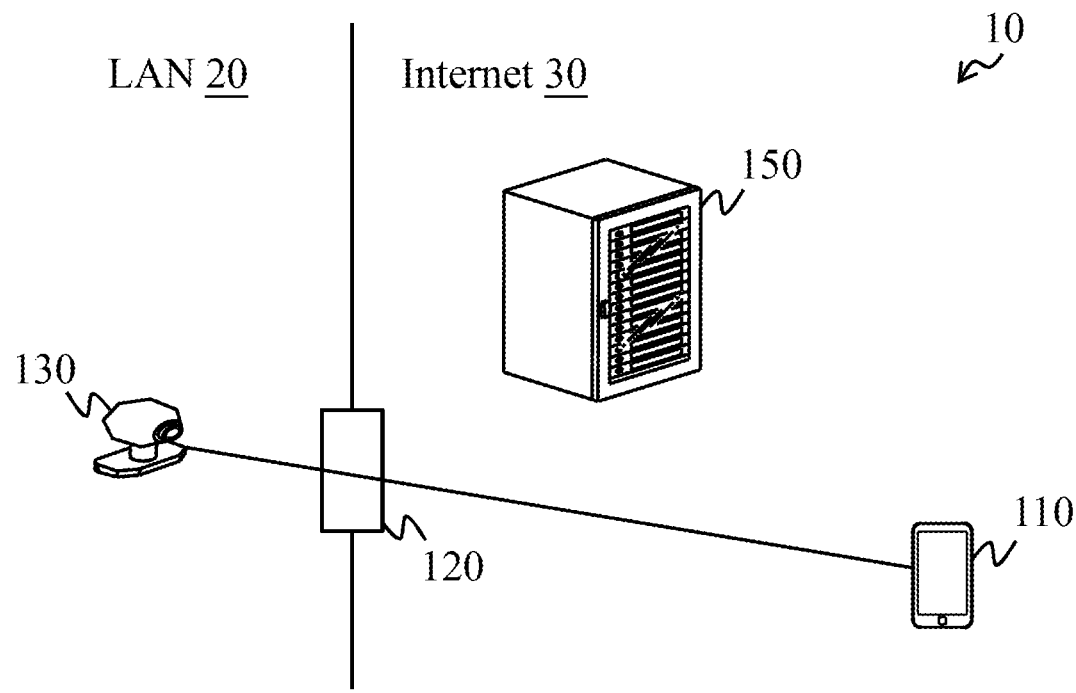
Figure 2:
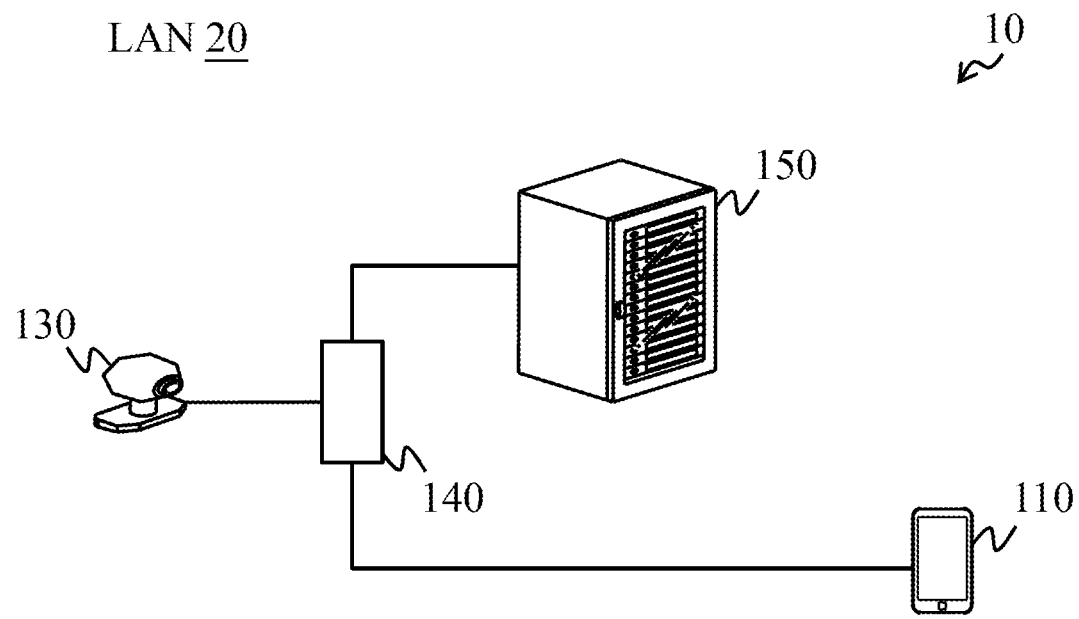
FIG. 2 is a schematic diagram of a network communications system according to another embodiment of the present invention.

FIG. 1A and FIG. 1B are schematic diagrams of a network communications system according to an embodiment of the present invention. FIG. 2 is a schematic diagram of a network communications system according to another embodiment of the present invention. Refer to FIG. 1A, FIG. 1B, and FIG. 2, a network communications system 10 includes two networking apparatuses (for clear description, hereinafter respectively referred to as a first apparatus 110 and a second apparatus 130) and a connection server 150. The networking apparatuses (the first apparatus 110 and the second apparatus 130) may be any electronic apparatuses capable of connecting to a network, for example, a personal computer, a smart phone, a navigation device (PND), a notebook computer, a tablet computer (a Tablet or a Pad), a video camera, an IP cam, or an intelligent appliance.

In some embodiments, it is assumed that the first apparatus 110 is a client apparatus that, on its initiative, proposes a connection request, and the second apparatus 130 is a remote apparatus that passively accepts the connection request. Refer to FIG. 1A and FIG. 2, when the first apparatus 110 intends to perform P2P (point-to-point or peer-to-peer) connection to the second apparatus 130, the first apparatus 110 sends a connection request packet to the connection server 150 through a network, so as to request to perform P2P connection to the second apparatus 130. The connection request packet includes a device identifier (Unique Identification, UID) of a connection target (the second apparatus 130) and a network location indicating a source of the packet (namely, connection information of the first apparatus 110). After the connection server 150 receives the connection request packet, the connection server 150 reads connection information of the second apparatus 130 from its storage unit according to the device identifier of the second apparatus 130 and feeds back the connection information of the second apparatus 130 to the first apparatus 110. In addition, the connection server 150 sends the connection information of the first apparatus 110 to the second apparatus 130 based on the connection information of the second apparatus 130, so as to notify the second apparatus 130 of performing P2P connection to the first apparatus 110. Then, the second apparatus 130 and the first apparatus 110 can form a P2P connection therebetween respectively according to the connection information of the first apparatus 110 and the connection information of the second apparatus 130, as shown in FIG. 1B and FIG. 2. Hence, although a communication connection between the first apparatus 110 and second apparatus 130 being a P2P connection is used as an example, the present invention is not limited thereto, and the communication connection between the first apparatus 110 and the second apparatus 130 may also be a relay connection through a connection server 150 or another connection server.

Each connection information includes a network address (IP Address) at which a networking apparatus is located. In some embodiments, Each connection information may further include a port number and/or a type of an address translator (NAT).

In some embodiments, the first apparatus 110 and the second apparatus 130 may be located at the same network or different networks. For example, refer to FIG. 1A and FIG. 1B, the second apparatus 130 is located in a local area network (LAN) 20 formed by an address translator 120, and the first apparatus 110 and the connection server 150 are located in an internet 30. Hence, the second apparatus 130 is located behind the address translator 120 (with respect to the internet 30), and the second apparatus 130 is connected to the internet 30 through the address translator 120. However, the present invention is not limited thereto. In another example, the first apparatus 110 and the second apparatus 130 may be located at the same LAN. For example, refer to FIG. 2, the first apparatus 110, the second apparatus 130, and the connection server 150 are located at the same LAN 20 and are communication-connected to each other through one or more network switches or hubs 140. In still another example, the first apparatus 110 may be located in another LAN (not shown in the drawing) formed by another address translator, that is, the first apparatus 110 and the second apparatus 130 are respectively located at two different LANs.

Figure 3:
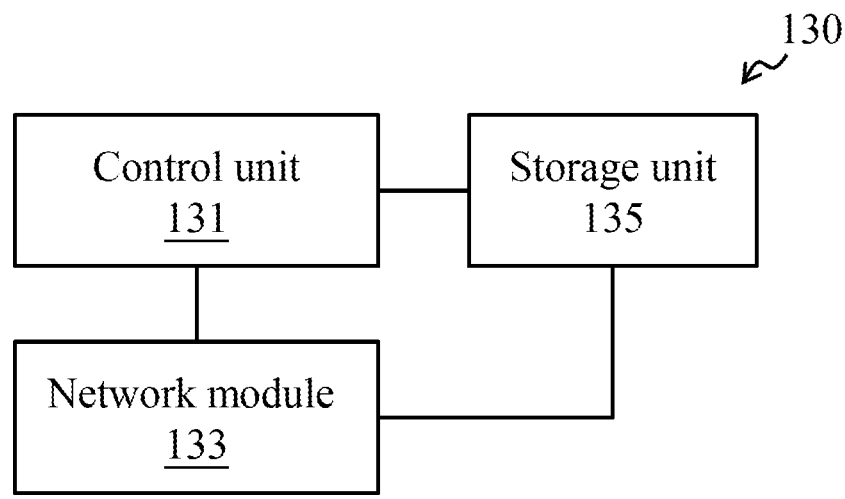
FIG. 3 is a schematic diagram of a networking apparatus according to an embodiment.

FIG. 3 is a schematic diagram of a networking apparatus according to an embodiment.

In some embodiments, refer to FIG. 3, the second apparatus 130 includes a control unit 131, a network module 133, and a storage unit 135. The control unit 131 is coupled to the network module 133 and the storage unit 135, and the network module 133 is couple to the storage unit 135. In some embodiments, the control unit 131, the network module 133, and the storage unit 135 may be implemented by a network chip. In addition, the second apparatus 130 may further include a functional module that provides a main function of the apparatus (not shown in the drawing). For example, when the second apparatus 130 is an IP cam, the second apparatus 130 may further include a functional module having a photographing function (namely, a photographing module). In another example, when the second apparatus 130 is an access control system, the second apparatus 130 may further include a functional module having an access control function.

In the present invention, the second apparatus 130 is a low power consumption apparatus. In other words, in addition to a normal running mode, the second apparatus 130 also has a power-saving mode (namely, a sleep mode). In the power-saving mode, the second apparatus 130 enters a sleep state to reduce power consumption. However, when the running state of the second apparatus 130 is the sleep state (that is, in the sleep mode), the network module 133 of the second apparatus 130 still keeps running, that is, the network module 133 does not sleep.

In the normal running mode, the second apparatus 130 and the connection server 150 are in a normal connection state, and the control unit 131 would send a normal login packet to the connection server 150 as scheduled through the network module 133, so as to provide connection information of a network location at which the second apparatus 130 is located. In addition, in the normal connection state, the control unit 131 would also send various service requests to the connection server 150 through the network module 133, and the connection server 150 accordingly responds to the various service requests from the second apparatus 130.

Figure 4:
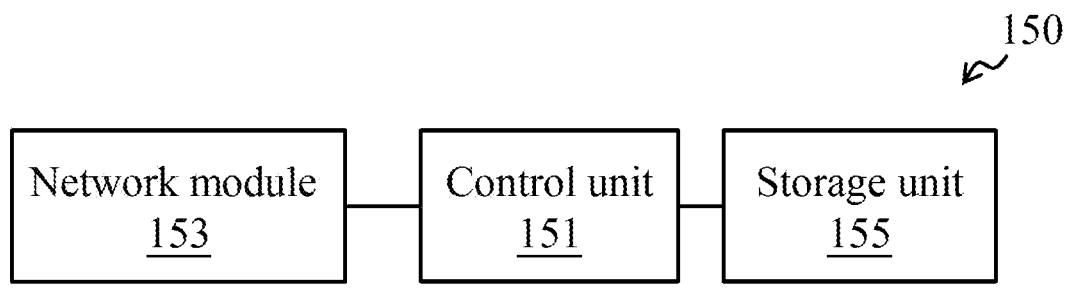
FIG. 4 is a schematic diagram of a connection server according to an embodiment.

FIG. 4 is a schematic diagram of a connection server according to an embodiment.

In some embodiments, refer to FIG. 4, the connection server 150 includes a control unit 151, a network module 153, and a storage unit 155. The control control unit 151 connects to the network module 153 and the storage unit 155.

In some embodiments, when the first apparatus 110 intends to perform communication connection to the second apparatus 130 in the sleep state, the first apparatus 110 may first wake up the second apparatus 130 by means of the connection server 150.

Figure 5:
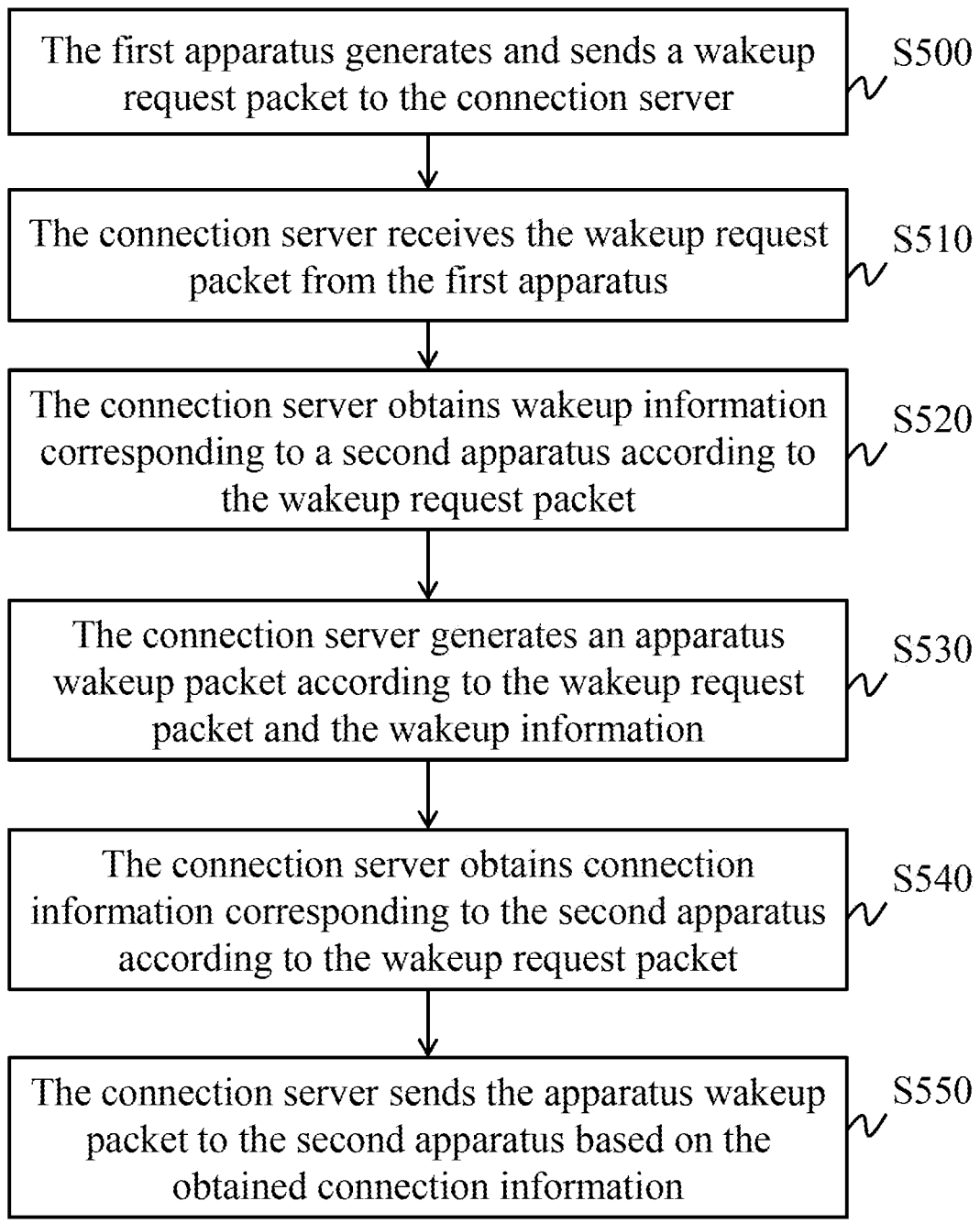
FIG. 5 is a flowchart of a first part of a remote wakeup method according to an embodiment.
Figure 6:
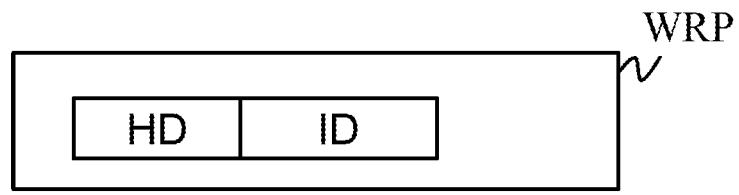
FIG. 6 is a schematic diagram illustrating an overview of a wakeup request packet according to an embodiment.

FIG. 5 is a flowchart of a first part of a remote wakeup method according to an embodiment. FIG. 6 is a schematic diagram illustrating an overview of an embodiment of a wakeup request packet.

Refer to FIG. 1 to FIG. 5, to wake up the second apparatus 130, the first apparatus 110 generates a wakeup request packet and sends the wakeup request packet to the connection server 150 through a network (the internet 30 or the LAN 20 and the internet 30) (step S500). The wakeup request packet WRP includes a general information HD and the device identifier ID of the second apparatus 130. In some embodiments, the general information HD and the device identifier ID of the second apparatus 130 may be located at a header of the wakeup request packet WRP. In some embodiments, the wakeup request packet WRP may further include a packet content.

After the control unit 151 receives the wakeup request packet WRP from the first apparatus 110 through the network module 153 (step S510), the control unit 151 obtains wakeup information corresponding to the second apparatus 130 from the storage unit 155 according to the device identifier ID in the wakeup request packet (step S520). In addition, the control unit 151 generates an apparatus wakeup packet according to the wakeup request packet WRP and the wakeup information (step S530).

Figure 7:
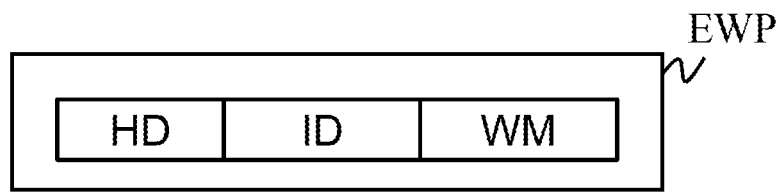
FIG. 7 is a schematic diagram illustrating an overview of an apparatus wakeup packet according to an embodiment.

FIG. 7 is a schematic diagram illustrating an overview of an embodiment of an apparatus wakeup packet.

In some embodiments, the control unit 151 combines the wakeup request packet WRP (the general information HD and the device identifier ID) and the wakeup information WM into an unencrypted packet and performs an encryption calculation on the unencrypted packet, so as to generate an apparatus wakeup packet EWP, as shown in FIG. 7. An encryption operation may be using an encryption technology to perform encryption processing on the unencrypted packet. The encryption technology may be, for example (but not limited to): the Message-Digest Calculation (MD5), the Secure Hash Calculation (SHA), the Rivest-Shamir-Adleman (RSA) encryption calculation, or the Caesar Cipher calculation.

In some embodiments, in the unencrypted packet formed on the control unit 151, a sum of data sizes of the device identifier ID and the wakeup information WM may be greater than or equal to one encryption unit of the encryption calculation. For example, when the encryption unit of the encryption calculation is 16 bytes, the sum of the device identifier ID and the wakeup information WM is greater than or equal to 16 bytes. In some embodiments, a data size of the wakeup information WM may be smaller than or equal to one encryption unit. For example, when the encryption unit of the encryption calculation is 16 bytes, the wakeup information WM is greater than or equal to 16 bytes.

In addition, the control unit 151 may also obtain connection information corresponding to the second apparatus 130 from the storage unit 155 according to the device identifier ID in the wakeup request packet WRP (step S540). In other words, the storage unit 155 of the connection server 150 stores the connection information and the wakeup information WM that correspond to the second apparatus 130.

In some embodiments, the storage unit 155 records the device identifier ID, the connection information AD, and the wakeup information WM of the second apparatus 130 and correspondences between the information, as shown in Table 1 below. The control unit 151 obtains wakeup information WM and connection information AD that correspond to the device identifier ID from the storage unit 155.

TABLE 1

| Serial No. | Device Identifier | Connection Information | Wakeup Information |
|---|---|---|---|
| 1 | ID | AD | WM |
| 2 | Device identifier 2 | Connection information 2 | Wakeup information 2 |
| . | . | . | . |
| . | . | . | . |
| . | . | . | . |

In some embodiments, the device identifier ID of the second apparatus 130 and the information, such as the connection information AD, that corresponds to the second apparatus 130 may be provided to the connection server 150 when the second apparatus 130 performs communication connection to the connection server 150, so that the information is recorded in the storage unit 155.

Then, the control unit 151 sends the apparatus wakeup packet EWP to the second apparatus 130 through the network module 153 based on the obtained connection information AD (step S550), that is, sends the apparatus wakeup packet EWP through a network to the second apparatus 130 located at a network address in the connection information AD.

Figure 8:
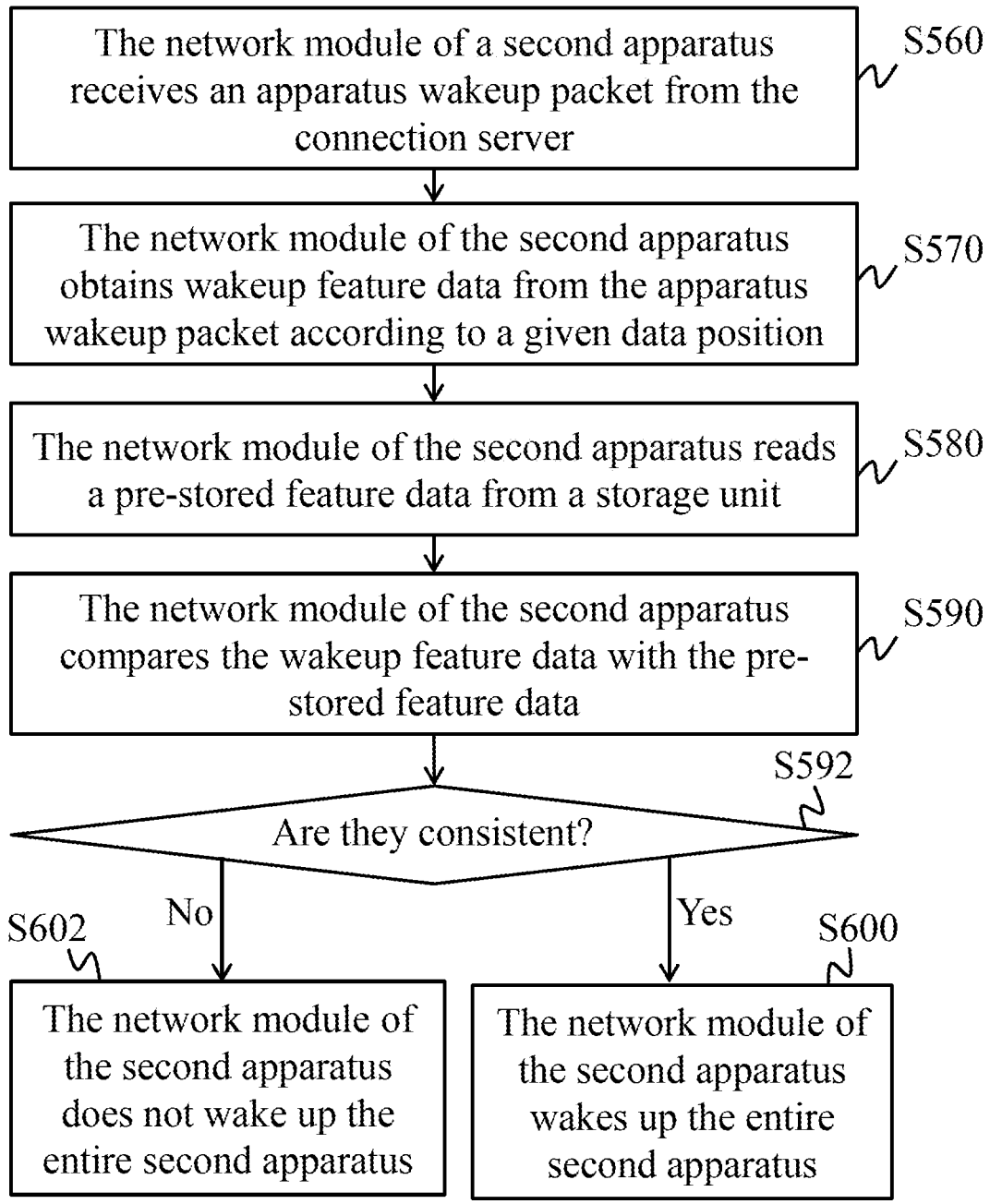
FIG. 8 is a flowchart of a second part of a remote wakeup method according to an embodiment.

FIG. 8 is a flowchart of a second part of a remote wakeup method according to an embodiment.

With reference to FIG. 8, because when the second apparatus 130 in the sleep state, the the network module 133 thereof still keeps running, the network module 133 of the second apparatus 130 can still receive the apparatus wakeup packet EWP from the connection server 150 (step S560).

When the network module 133 receives the apparatus wakeup packet EWP (step S560), the network module 133 obtains a wakeup feature data from the apparatus wakeup packet EWP according to a given data position (step S570) and reads pre-stored feature data that is pre-stored before the sleep from the storage unit 135 (step S580). A data size of the wakeup feature data is smaller than a data size of the apparatus wakeup packet EWP. Hence, the wakeup feature data is a segment of data of the apparatus wakeup packet EWP.

In some embodiments, a data size of the wakeup feature data may be at least one encryption unit of the foregoing encryption calculation. In other words, the given data position is at least one encryption unit at a specific position of the apparatus wakeup packet EWP. For example, when the encryption unit of the encryption calculation is 16 bytes, the wakeup feature data is a multiple of 16 bytes. In some embodiments, data of the wakeup feature data may be data of last at least one encryption unit in the apparatus wakeup packet EWP. In other words, the given data position is the last at least one encryption unit. For example, when the encryption unit of the encryption calculation is 16 bytes, the wakeup feature data is last 16 bytes or 32 bytes in the apparatus wakeup packet EWP. Particularly, the obtained wakeup feature data includes data with consistency (for example, the device identifier ID and wakeup information WM) in the apparatus wakeup packet EWP, but does not include dynamically changing data (for example, the general information HD). The data with consistency refers to data that would not change with the change of different environmental parameters with regard to multiple packets sent to the same networking apparatus. The dynamically changing data refers to data that changes with the change of environmental parameters with regard to multiple packets sent to the same networking apparatus, for example, a version, a service request code, and a sending time in the general information HD.

In some embodiments, the wakeup feature data may include an encrypted device identifier ID and encrypted wakeup information WM. In other words, a sum of data sizes of the device identifier ID and the wakeup information WM is a multiple of the encryption unit, and the multiple is a positive integer. In some embodiments, the wakeup feature data may include an encrypted partial device identifier ID and encrypted wakeup information WM. In other words, a sum of data sizes of the partial device identifier ID and the wakeup information WM is a multiple of the encryption unit, and the multiple is a positive integer.

Subsequently, the network module 133 compares the wakeup feature data with the pre-stored feature data (step S590), so as to determine whether the two are the same (step S592). When the wakeup feature data is consistent with the pre-stored feature data, the network module 133 wakes up the entire second apparatus 130 (step S600), so as to enable the second apparatus 130 to accept a communication link demand of the first apparatus 110 (completing formation of a P2P connection or formation of a relay connection). When the wakeup feature data is inconsistent with the pre-stored feature data, the network module 133 ignores (discards) the apparatus wakeup packet EWP, that is, does not wake up the entire second apparatus 130 (step S602).

In some embodiments, in the sleep mode, the network module 133 can directly read the pre-stored feature data that is pre-stored by the control unit 131 into the storage unit 135, so as to provide it for the network module 133 to perform comparison and wakeup.

In some other embodiments, the storage unit 135 may include a plurality of storage components (hereinafter respectively referred to as a primary storage unit and a micro storage unit). After forming the pre-stored feature data, the control unit 131 would store the pre-stored feature data into the primary storage unit. In addition, before entering the sleep, the network module 133 would load data needed for wakeup (for example, the pre-stored feature data) from the primary storage unit to the micro storage unit, so as to provide it for the network module 133 to perform comparison and wakeup. In addition, in the sleep mode, the network module 133 and the micro storage unit both still keep running (power supply). The micro storage unit may be built in the network module 133.

Figure 9:
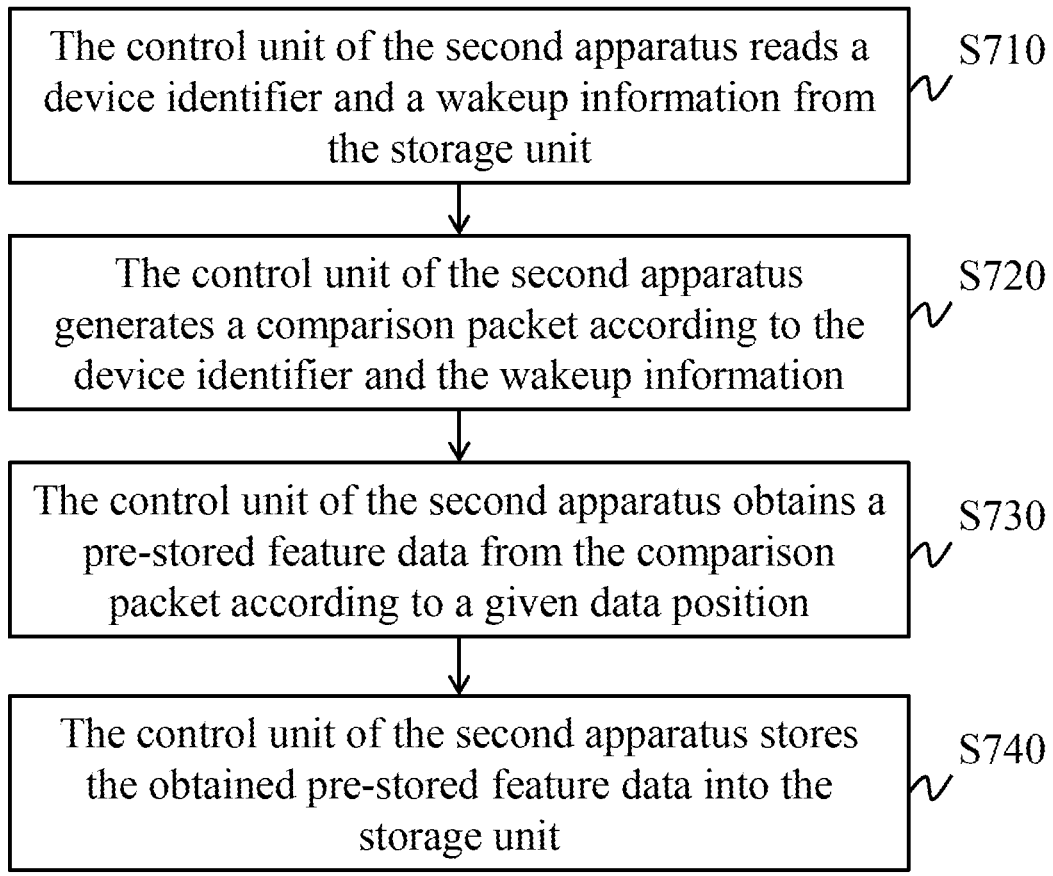
FIG. 9 is a flowchart of a third part of a remote wakeup method according to an embodiment.

FIG. 9 is a flowchart of a third part of a remote wakeup method according to an embodiment.

In some embodiments, refer to FIG. 9, before entering the sleep mode, the control unit 131 reads a device identifier ID and wakeup information WM of the second apparatus 130 from storage unit 135 (step S710) and generates a comparison packet according to the device identifier ID and the wakeup information WM. The wakeup information WM in the second apparatus 130 (the storage unit 135) is the same as the wakeup information WM in the connection server 150 (the storage unit 155).

Figure 10:
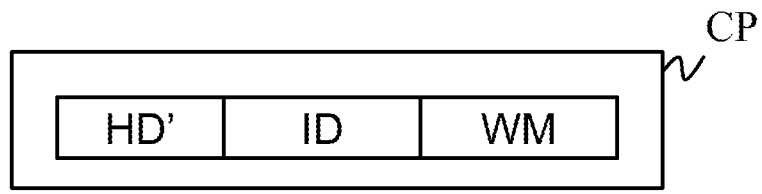
FIG. 10 is a schematic diagram illustrating an overview of a comparison packet according to an embodiment.

FIG. 10 is a schematic diagram illustrating an overview of a comparison packet according to an embodiment.

In some embodiments, the control unit 131 combines general information HD', the device identifier ID, and the wakeup information WM into an unencrypted packet and performs an encryption calculation on the unencrypted packet, so as to generate a comparison packet CP, as shown in FIG. 10. Hence, the second apparatus 130 and the connection server 150 perform encryption calculation by using the same encryption technology. An encryption operation may be using an encryption technology to perform encryption processing on the unencrypted packet. The encryption technology may be, for example (but not limited to): the Message-Digest Calculation (MD5), the Secure Hash Calculation (SHA), the Rivest-Shamir-Adleman (RSA) encryption calculation, or the Caesar Cipher calculation. In some embodiments, the general information HD' and the device identifier ID may be located in a header of the comparison packet CP, and the wakeup information WM is a packet content of the comparison packet CP.

In some embodiments, in the unencrypted packet formed on the control unit 131, a sum of data sizes of the device identifier ID and the wakeup information WM may be greater than or equal to one encryption unit of the encryption calculation. For example, when the encryption unit of the encryption calculation is 16 bytes, the sum of the device identifier ID and the wakeup information WM is greater than or equal to 16 bytes. In some embodiments, a data size of the wakeup information WM may be smaller than or equal to one encryption unit. For example, when the encryption unit of the encryption calculation is 16 bytes, the wakeup information WM is greater than or equal to 16 bytes.

Then, the control unit 131 obtains a pre-stored feature data from a comparison packet CP according to a given data position (step S730) and stores the pre-stored feature data in the storage unit 135 (step S740). A data size of the pre-stored feature data is smaller than a data size of the comparison packet CP.

In some embodiments, a data size of the pre-stored feature data may be at least one encryption unit of the foregoing encryption calculation. In other words, the given data position is at least one encryption unit at a specific position of the comparison packet CP. For example, when the encryption unit of the encryption calculation is 16 bytes, the pre-stored feature data is a multiple of 16 bytes. Hence, the data size of the wakeup feature data and the data size of the pre-stored feature are the same number of encryption units in the same encryption calculation.

In some embodiments, data of the pre-stored feature data may be data of last at least one encryption unit in the comparison packet CP. In other words, the given data position is the last at least one encryption unit. For example, when the encryption unit of the encryption calculation is 16 bytes, the pre-stored feature data is last 16 bytes or 32 bytes in the comparison packet CP. Particularly, the obtained pre-stored feature data includes data with consistency (for example, the device identifier ID and wakeup information WM) in the comparison packet CP, but does not include dynamically changing data (for example, the general information HD). The data with consistency refers to data that would not change with the change of different environmental parameters with regard to multiple packets sent to the same networking apparatus. The dynamically changing data refers to data that changes with the change of environmental parameters with regard to multiple packets sent to the same networking apparatus, for example, a version, a service request code, and a sending time in the general information.

In some embodiments, the pre-stored feature data may include an encrypted device identifier ID and encrypted wakeup information WM. In other words, a sum of data sizes of the device identifier ID and the wakeup information WM is a multiple of the encryption unit, and the multiple is a positive integer. In some embodiments, the pre-stored feature data may include an encrypted partial device identifier ID and encrypted wakeup information WM. In other words, a sum of data sizes of the partial device identifier ID and the wakeup information WM is a multiple of the encryption unit, and the multiple is a positive integer.

In another embodiment, the control unit 131 may purely string the device identifier ID (partially or entirely) and the wakeup information WM and then performs encryption calculation on the strung data (unencrypted data) to generate pre-stored feature data (that is, directly producing the generated comparison packet into a pre-stored feature data).

In some embodiments, the wakeup information WM corresponding to the second apparatus 130 may be generated and stored into the storage unit 135 by the second apparatus 130. In addition, the second apparatus 130 provides the generated wakeup information WM to the connection server 150 and records it in the storage unit 155 of the connection server 150. Therefore, the connection server 150 and the second apparatus 130 both have the wakeup information WM with the same content. In some other embodiments, the wakeup information WM corresponding to the second apparatus 130 may be generated by the connection server 150 and recorded in the storage unit 155 of the connection server 150. In addition, when the second apparatus 130 is in communication connection to the connection server 150, the connection server 150 provides the generated wakeup information WM to the second apparatus 130 and further also records it in the storage unit 135 of the second apparatus 130. Therefore, the connection server 150 and the second apparatus 130 both have the wakeup information WM with the same content. In some embodiments, the wakeup information WM may be an authorization key.

In some embodiments, the connection server 150 may determine a running state (normally connection (online) or offline) of the second apparatus 130 based on whether a normal login packet from the second apparatus 130 is received and records the running state of the second apparatus 130.

In some embodiments, when the second apparatus 130 first gets connection by using the normal login packet and logs into the connection server 150, the control unit 151 of the connection server 150 determines that the running state of the second apparatus 130 is normally connection and records the running state of the second apparatus 130 as normally connection in the storage unit 154. After the login of the second apparatus 130, the control unit 151 of the connection server 150 detects the normal login packet from the second apparatus 130 according to a given time. If the normal login packet is not received when the given time expires, the control unit 151 of the connection server 150 determines that the running state of the second apparatus 130 is offline and records the running state of the second apparatus 130 as offline in the storage unit 155.

In some embodiments, the storage unit 135 stores a login data. The login data is provided for the second apparatus 130 to log into the connection server 150.

Figure 11:
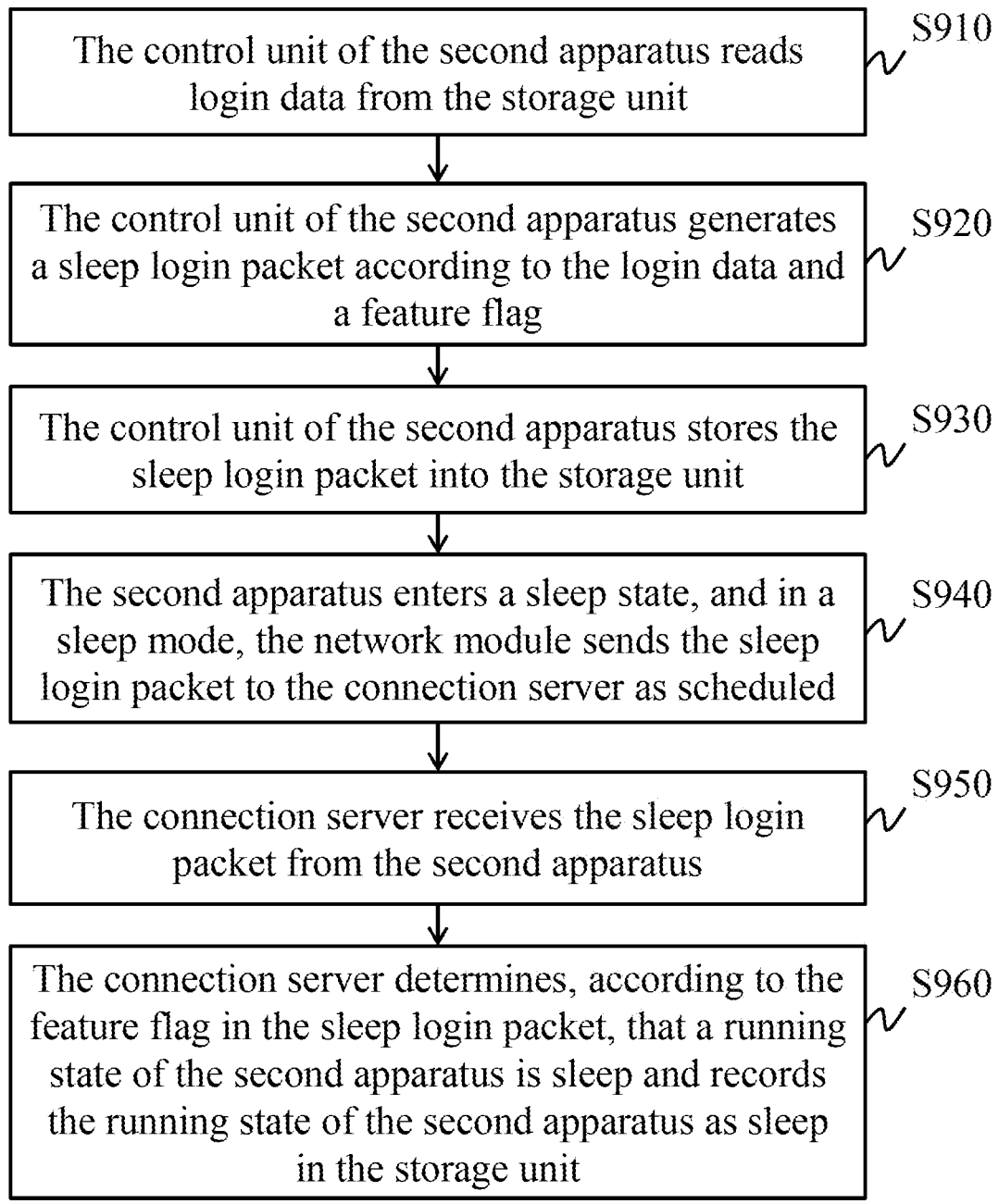
FIG. 11 is a flowchart of a method for identifying a running state of a second apparatus according to another embodiment.
Figure 12:
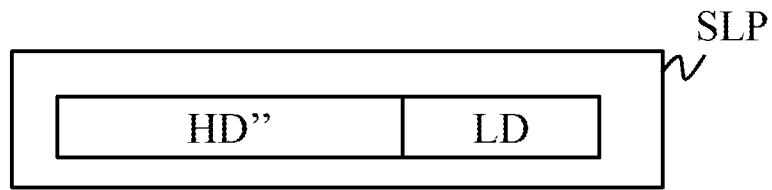
FIG. 12 is a schematic diagram illustrating an overview of a sleep login packet according to an embodiment.
Figure 13:
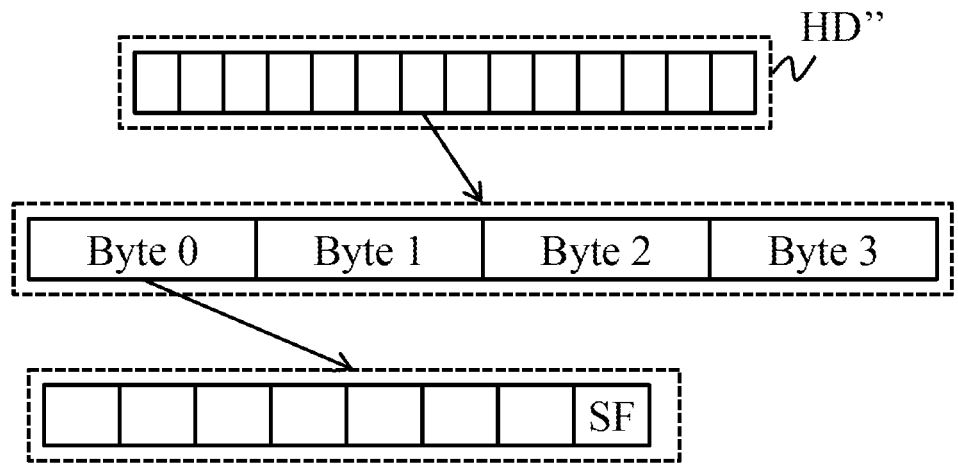
FIG. 13 is a schematic diagram of a position of a feature flag in a sleep login packet according to an embodiment.

FIG. 11 is a flowchart of a method for identifying a running state of a second apparatus according to another embodiment. FIG. 12 is a schematic diagram illustrating an overview of a sleep login packet according to an embodiment. FIG. 13 is a schematic diagram of a position of a feature flag in a sleep login packet according to an embodiment.

Refer to FIG. 11 to FIG. 13, before entering the sleep mode, the control unit 131 reads login data LD from the storage unit 135 (step S910) and generates sleep login packet SLP according to the login data LD and a feature flag SF (step S920). The control unit 131 stores the generated sleep login packet SLP into the storage unit 135 (step S930), and then, the second apparatus 130 enters the sleep mode (step S940). Moreover, in the sleep mode, the network module 133 sends the sleep login packet SLP to the connection server 150 as scheduled (step S940). In other words, in the sleep mode, the network module 133 can directly read the sleep login packet SLP that is pre-stored by the control unit 131 in the storage unit 135.

In some embodiments, the storage unit 135 may include a plurality of storage components (hereinafter respectively referred to as a primary storage unit and a micro storage unit). After forming the sleep login packet SLP, the control unit 131 would store the sleep login packet SLP into the primary storage unit. In addition, before entering the sleep, the network module 133 would load the sleep login packet SLP from the primary storage unit to the micro storage unit, so as to provide it for the network module 133 to continue sending the sleep login packet SLP to the connection server at intervals in the sleep mode.

In some embodiments, the feature flag SF may be located in a header of the sleep login packet SLP.

In some embodiments of step S940, the network module 133 may send the sleep login packet SLP to the connection server 150 at a fixed time interval. In some other embodiments of step S940, if second apparatus 130 is not woken up for a long time, the network module 133 may change from sending the sleep login packet SLP to the connection server 150 at a fixed time interval to sending the sleep login packet SLP to the connection server 150 at a gradually increasing time interval. Moreover, when the second apparatus 130 just enters the sleep mode, the network module 133 sends the sleep login packet SLP to the connection server 150 every 25 seconds. If the second apparatus 130 is not woken up for a long time (for example: entering the sleep mode for one hour), the network module 133 may gradually prolong a time interval of transmission from 25 seconds. However, when the second apparatus 130 is woken up, the network module 133 recovers the time interval of transmission as a default value 25 seconds. In some embodiments, the network module 133 calculates a time interval of the next transmission by using an calculation, so that the time of transmission is gradually prolonged with the time of the sleep.

The control unit 151 of the connection server 150 receives the sleep login packet SLP from the second apparatus 130 through the network module 153 (step S950). After receiving the sleep login packet SLP, the control unit 151 of the connection server 15 determines that the running state of the second apparatus 130 is sleep according to the feature flag SF in the sleep login packet SLP and records the running state of the second apparatus 130 as sleep in the storage unit 153 (step S960).

In some embodiments, an essential difference between the sleep login packet SLP and the normal login packet is merely whether the feature flag SF is possessed. For example, if a login packet received by the connection server 150 from the second apparatus 130 has a feature flag SF (that is, the sleep login packet SLP), the control unit 151 of the connection server 150 determines that the running state of the second apparatus 130 is sleep. Otherwise, if a login packet received by the connection server 150 from the second apparatus 130 does not have a feature flag SF (that is, the normal login packet), the control unit 151 of the connection server 150 determines that the running state of the second apparatus 130 is normally connection. Further, if the connection server 150 does not receive any login packet from the second apparatus 130 when a given time expires, the control unit 151 of the connection server 150 determines that the running state of the second apparatus 130 is offline.

In some embodiments, the feature flag SF may be located in a header HD" of the sleep login packet SLP, as shown in FIG. 12 and FIG. 13.

In some embodiments, the login data LD may include an account and a password. The account may be the device identifier ID of the second apparatus 130.

Figure 14:
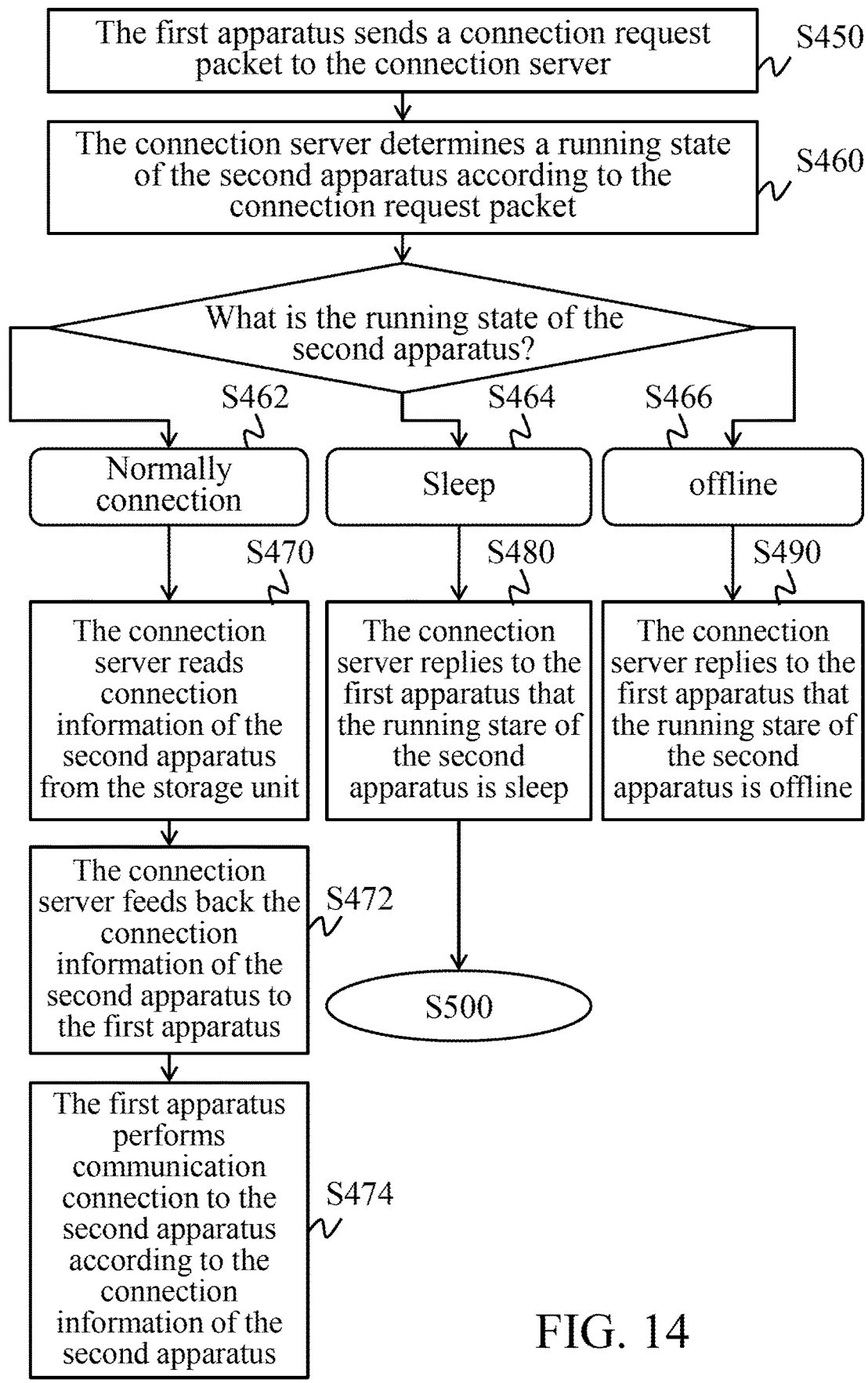
FIG. 14 is a partial flowchart of a remote wakeup method according to another embodiment.

FIG. 14 is a partial flowchart of a remote wakeup method according to another embodiment.

In some embodiments, refer to FIG. 14, when the first apparatus 110 intends to perform communication connection to the second apparatus 130, the first apparatus 110 sends a connection request packet used to request for performing communication connection to the second apparatus 130 to the connection server 150 through a network (step S450), so as to inquire the connection server 150 for the connection information of the second apparatus 130 and the running state of the second apparatus 130. The control unit 151 of the connection server 150 receives the connection request packet from the first apparatus 110 through the network module 153 and searches for (determines) the running state of the second apparatus 130 recorded in the storage unit 155 according to the device identifier ID of the second apparatus 130 in the connection request packet (step S460).

When determining that the running state of the second apparatus 130 is normally connection (step S462), the control unit 151 of the connection server 150 reads connection information of the second apparatus 130 from the storage unit 155 (step S470) and feeds back the connection information of the second apparatus 130 to the first apparatus 110 through the network module 153 (step S472), so as to enable the first apparatus 110 to perform communication connection to the second apparatus 130 according to the connection information of the second apparatus 130 (step S474).

When determining that the running state of the second apparatus 130 is sleep (step S464), the control unit 151 of the connection server 150 replies through the network module 153 to the first apparatus 110 that the running state of the second apparatus 130 is sleep (step S480), so as to enable the first apparatus 110 to send a wakeup request packet (step S500).

When determining that the running state of the second apparatus 130 is offline (step S466), the control unit 151 of the connection server 150 replies through the network module 153 to the first apparatus 110 that the running state of the second apparatus 130 is offline (step S490), so as to enable the first apparatus 110 to request for a communication connection again after a period of time.

Hence, although a communication connection between the first apparatus 110 and second apparatus 130 being a P2P connection is used as an example, the present invention is not limited thereto, and the communication connection between the first apparatus 110 and the second apparatus 130 may also be a relay connection through a connection server 150 or another connection server.

In some embodiments, the connection server 150 may merely have a capability of identifying that the running state of the second apparatus 130 is normally connection or offline. In this way, when the connection server 150 replies to the first apparatus 110 that the running state of the second apparatus 130 is offline (step S490), the first apparatus 110 may send a wakeup request packet to the connection server 150 (that is, performing step S500 and subsequent steps thereof) (not shown in the drawing), to carry out a wakeup procedure of the second apparatus 130.

Figure 15:
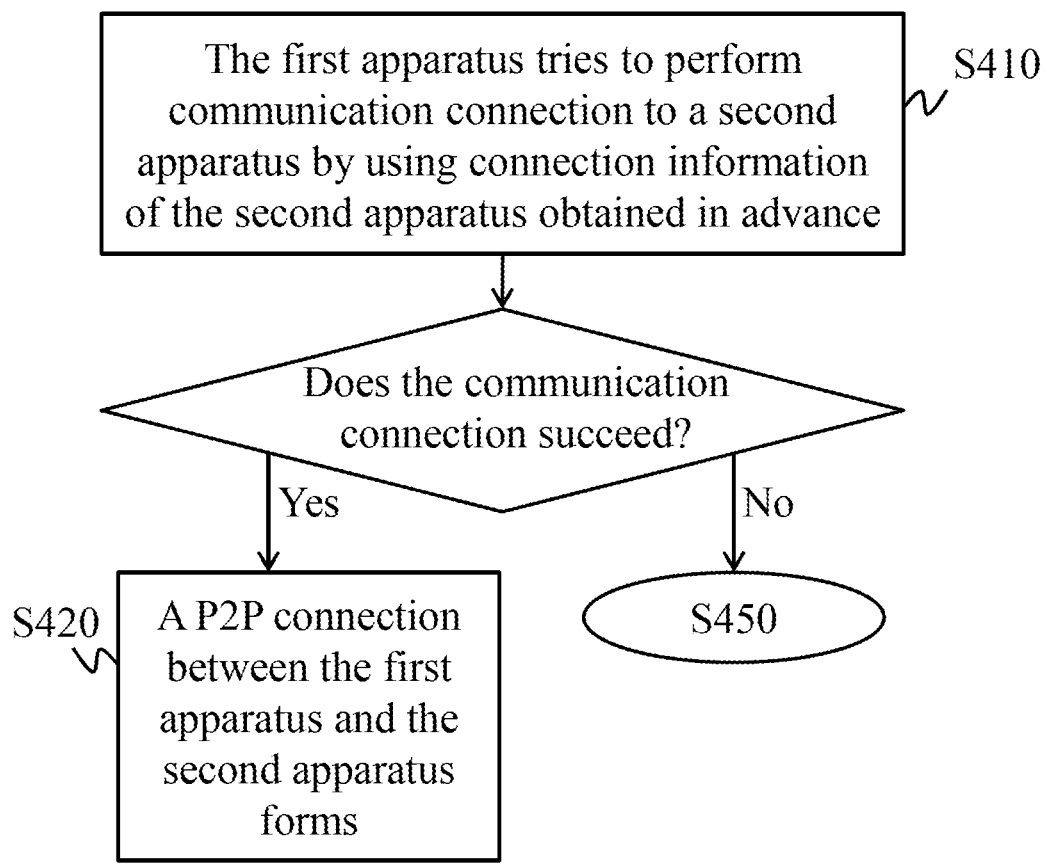
FIG. 15 is a partial flowchart of a remote wakeup method according to still another embodiment.

FIG. 15 is a partial flowchart of a remote wakeup method according to still another embodiment.

In some embodiments, refer to FIG. 15, when the first apparatus 110 intends to perform P2P connection to the second apparatus 130 (which is not the first connection), the first apparatus 110 may try to perform communication connection to the second apparatus 130 by using the previously obtained connection information of the second apparatus 130 (trying to form a P2P connection between the two) (step S410). Only when the communication connection fails (for example, no response from the second apparatus is received), the first apparatus 110 sends a wakeup request packet to the connection server 150 (step S450). When the communication connection succeeds, a P2P connection between the first apparatus 110 and the second apparatus 130 is formed (step S420). Hence, although a communication connection between the first apparatus 110 and second apparatus 130 being a P2P connection is used as an example, the present invention is not limited thereto, and the communication connection between the first apparatus 110 and the second apparatus 130 may also be a relay connection through a connection server 150 or another connection server.

In some other embodiments, when the connection server 150 replies to the first apparatus 110 that the running state of the second apparatus 130 is offline, the first apparatus 110 may send a wakeup request packet to the connection server 150 at a fixed time interval (that is, repeatedly performing step S500 and subsequent steps thereof) and continuously try to perform communication connection to the second apparatus 130 until the communication connection succeeds (not shown in the drawing).

In some embodiments, the first apparatus 110 may ignore the running state of the second apparatus 130, and each time the first apparatus 110 tries to perform communication connection to the second apparatus 130, the first apparatus 110 sends a wakeup request packet at the same time (that is, performing step S500 and subsequent steps thereof) (not shown in the drawing). If the running state of the second apparatus 130 is normally connection, the connection server 150 disregards (ignores) the wakeup request packet WRP (which does not produce any effect).

It should be noted that although the steps are described in sequence in the preceding embodiments, this sequence is not a limitation to the present invention. Persons skilled in the art should understand that in a proper situation, execution sequences of some steps may be the same or exchanged. For example, wakeup information and connection information that correspond to a second apparatus are obtained at the same time, that is, step S520 and S540 are performed at the same time.

In some embodiments, in a network communications system 10, each component may execute a firmware or software calculation stored in its storage unit by means of its control unit, so as to perform the foregoing corresponding step. In other words, the storage unit is configured to store a relevant software/firmware program, information, data, or a combination thereof.

In some embodiments, each storage unit may be implemented by one or more storage components. Hence, the storage component may be, for example, a memory or a buffer, which is not limited herein. The memory may be, for example, a Read-Only Memory (ROM), a Random Access Memory (RAM), a volatile memory, a non-volatile memory, a static memory, a volatile storage device, a flash memory, and/or any device that stores digital information.

In conclusion, according to the remote wakeup method, connection server, and networking apparatus having a sleep mode of the present invention, the networking apparatus (namely, the second apparatus) may be enabled to enter an ultra-low power consumption state (the sleep state), and a first apparatus 110 can be provided to use a device identifier ID of the second apparatus 130 to directly initiate a wakeup request (a wakeup request packet WRP) to the remote second apparatus by means of the connection server 150, so that it is unnecessary to perform any setting (for example, settings on apparatuses such as a main board, a network card, and a firewall) or use network broadcasting to wake up the remote second apparatus without reducing a number of network packets in a local area network (LAN).

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A remote wakeup method, comprising: a connection server receiving a wakeup request packet from a first apparatus, wherein the wakeup request packet comprises a device identifier of a second apparatus, wherein the first apparatus is connected to the connection server via local area network or internet; the connection server obtaining wakeup information stored in the connection server according to the wakeup request packet, wherein the wakeup information stored in the connection server is the same as wakeup information stored in the second apparatus; the connection server generating an apparatus wakeup packet according to the wakeup request packet and the wakeup information, wherein the apparatus wakeup packet comprises the device identifier of the second apparatus from the wakeup request packet and the obtained wakeup information; the connection server obtaining a network address corresponding to the second apparatus from a storage unit of the connection server according to the wakeup request packet;

the connection server sending the apparatus wakeup packet to the second apparatus based on the network address, wherein wakeup feature data is a segment of data of the apparatus wakeup packet and is for determining whether the entire second apparatus be awoken.

2. The remote wakeup method according to claim 1, wherein the step of generating the apparatus wakeup packet comprises: combining the wakeup request packet and the wakeup information into an unencrypted packet; and performing an encryption calculation on the unencrypted packet to generate the apparatus wakeup packet.

3. The remote wakeup method according to claim 2, wherein one encryption unit of the encryption calculation comprises entire data or partial data of the device identifier and the wakeup information.

4. The remote wakeup method according to claim 2, wherein a sum of data sizes of the device identifier and the wakeup information is a multiple of the encryption unit of the encryption calculation, and the multiple is a positive integer.

5. The remote wakeup method according to claim 2, further comprising: receiving, by the second apparatus, the apparatus wakeup packet; obtaining, by the second apparatus, a wakeup feature data from the apparatus wakeup packet, and the wakeup feature packet comprises entire data or partial data of the device identifier and the wakeup information; comparing the wakeup feature data with a pre-stored feature data, wherein the pre-stored feature data is pre-stored in the second apparatus before the second apparatus sleeps; and when the wakeup feature data is consistent with the pre-stored feature data, waking up the entire second apparatus.

6. The remote wakeup method according to claim 5, wherein a data size of the wakeup feature data and a data size of the pre-stored feature data are both at least one encryption unit of the encryption calculation.

7. The remote wakeup method according to claim 1, further comprising: receiving a sleep login packet from the second apparatus; and recording a running state of the second apparatus as a sleep state in the storage unit according to the sleep login packet.

8. The remote wakeup method according to claim 7, wherein the sleep login packet has a feature flag, and the feature flag indicates that the running state of the second apparatus is the sleep state.

9. The remote wakeup method according to claim 1, further comprising: receiving a connection request packet from the first apparatus, wherein the connection request packet is used to request for performing communication connection to the second apparatus; determining a running state of the second apparatus according to the connection request packet; and when the running state of the second apparatus is a sleep state, replying to the first apparatus that the second apparatus sleeps.

10. The remote wakeup method according to claim 1, wherein the steps of obtaining the wakeup information and the network address comprise: reading the wakeup information and the network address that correspond to the device identifier from a storage unit.

11. A connection server, comprising:
a network module; a storage unit, which stores a network address and wakeup information that correspond to a second apparatus; and a control unit, which connects to the network module and storage unit, receives a wakeup request packet from a first apparatus through the network module, obtains the wakeup information stored in the storage unit and the network address stored in the storage unit according to the wakeup request packet, generates an apparatus wakeup packet according to the received wakeup request packet and the obtained wakeup information, and sends the generated apparatus wakeup packet to the second apparatus through the network module according to the network address, wherein the wakeup request packet comprises a device identifier of the second apparatus, and the apparatus wakeup packet comprises the device identifier from the wakeup request packet and the obtained wakeup information of the second apparatus, wherein the wakeup information stored in the connection server is the same as wakeup information stored in the second apparatus, and wherein wakeup feature data is a segment of data of the apparatus wakeup packet and is for determining whether the entire second apparatus be awoken.

12. The connection server according to claim 11, wherein the control unit combines the wakeup request packet and the wakeup information into one unencrypted packet and performs an encryption calculation on the unencrypted packet to generate an apparatus wakeup packet.

13. The connection server according to claim 12, wherein one encryption unit of the encryption calculation comprises entire data or partial data of the device identifier and the wakeup information.

14. The connection server according to claim 12, wherein a sum of data sizes of the device identifier and the wakeup information is a multiple of the encryption unit of the encryption calculation, and the multiple is a positive integer.

15. The connection server according to claim 11, wherein the storage unit further stores a running state of the second apparatus, and the control unit receives a sleep login packet from the second apparatus through the network module and updates the running state of the second apparatus in the storage unit as a sleep state according to the sleep login packet.

16. The connection server according to claim 15, wherein the sleep login packet has a feature flag, and the feature flag indicates that the running state of the second apparatus is the sleep state.

17. The connection server according to claim 11, wherein when the control unit receives a connection request packet used to request for performing communication connection to the second apparatus from the first apparatus through the network module, the control unit determines a running state of the second apparatus according to the connection request packet and when determining that the running state of the second apparatus is a sleep state, replies to the first apparatus that the second apparatus sleeps.

18. The connection server according to claim 11, wherein the storage unit records the device identifier and correspondences between the device identifier and the wakeup information and between the network address and the wakeup information.

19. A networking apparatus having a normal running mode and a sleep mode, comprising: a network module; a storage unit, which stores a device identifier and wakeup information; and a control unit, which connects to the network module and storage unit, and before entering the sleep mode, generates a pre-stored feature data according to the device identifier and the wakeup information and stores the pre-stored feature data in the storage unit, wherein the pre-stored feature data comprises entire data or partial data of the device identifier and the wakeup information, wherein: in the normal running mode, the control unit sends a normal login packet through the network module, to provide a network address of the networking apparatus; in the sleep mode, the control unit sleeps, but the network module still keeps running and when receiving an apparatus wakeup packet sent to the network address of the networking apparatus from a connection server and generated by the connection server, compares the pre-stored feature data and a wakeup feature data being a segment of data of the apparatus wakeup packet to determine whether to wake up the entire networking apparatus.

20. The networking apparatus having a normal running mode and a sleep mode according to claim 19, wherein the control unit generates a comparison packet and obtains the pre-stored feature data from the comparison packet according to the device identifier and the wakeup information.

21. The networking apparatus having a normal running mode and a sleep mode according to claim 20, wherein in the sleep mode, when the network module receives the apparatus wakeup packet from an connection server, the network module captures a wakeup feature data from the apparatus wakeup packet according to a given data position and compares the wakeup feature data with the pre-stored feature data, wherein when the wakeup feature data is consistent with the pre-stored feature data, the network module wakes up the entire networking apparatus.

22. The networking apparatus having a normal running mode and a sleep mode according to claim 19, wherein a sum of data sizes of the device identifier and the wakeup information is a multiple of the encryption unit of the encryption calculation, and the multiple is a positive integer.

23. The networking apparatus having a normal running mode and a sleep mode according to claim 19, wherein the storage unit stores a login data, before entering the sleep mode, the control unit generates, according to the login data and a feature flag, a sleep login packet having the login data, and the feature flag indicates that a running state of the networking apparatus is sleep.

24. The networking apparatus having a normal running mode and a sleep mode according to claim 23, wherein the feature flag is located at a header of the sleep login packet.

25. The networking apparatus having a normal running mode and a sleep mode according to claim 23, wherein in the sleep mode, the network module periodically sends the sleep login packet to the connection server.

* * * * *